Oct. 12, 1943.  E. J. OTTO  2,331,498

SHEAVE

Filed Oct. 29, 1942

Inventor
E. J. Otto
by William S. Field
Agent

Patented Oct. 12, 1943

2,331,498

UNITED STATES PATENT OFFICE 2,331,498

SHEAVE

Eugene J. Otto, Milwaukee, Wis., assignor to Allis-Chalmers Manufacturing Company, Milwaukee, Wis., a corporation of Delaware Application October 29, 1942, Serial No. 463,768

5 Claims. (Cl. 287—52.06)

This invention relates to improvements in power transmission units in which a sheave or other driving or driven member is attached to a shaft in driving or driven relation.

It is an object of the invention to provide a demountable sheave and split sleeve unit easily and quickly assembled to or removable as a unit from, the shaft;

Another object is to provide an assembly in which the parts when unclamped, are held together by a snap ring;

Another object is to provide such an assembly in which the clamping force acts between two solid rings, and no large split flange member is necessary, forces on the split sleeve acting at a minimum radius to avoid warping tendency;

Another object is to provide an assembly which is light in weight and inexpensive to manufacture;

Still other advantages will be apparent from an inspection of the description herein, and the drawing, in which.

Similar numerals refer to similar parts throughout the several views.

Figure 1:
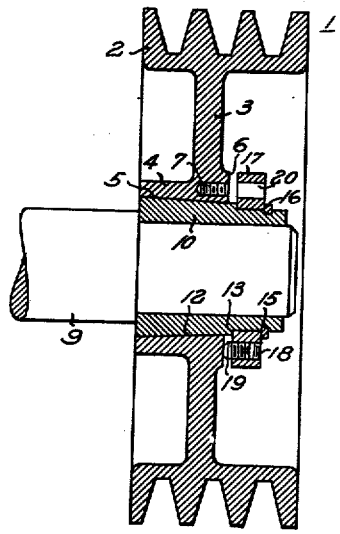
Fig. 1 is a cross sectional view of the sheave assembly clamped on the shaft, taken on line I—I of Fig. 3.
Figure 2:
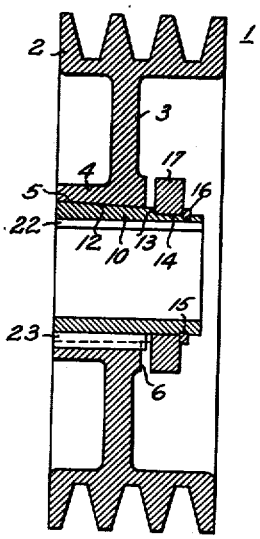
Fig. 2 is a cross sectional view taken on the line II—II of Fig. 3 with the shaft removed.
Figure 3:
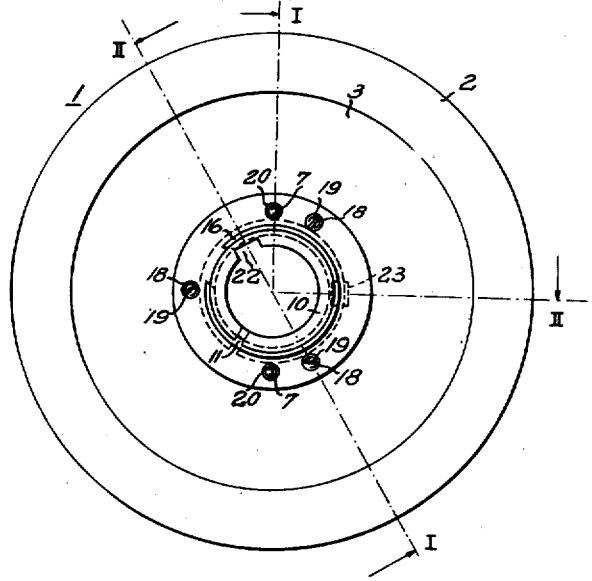
Fig. 3 is a front elevation view of the assembly.

In the embodiment of the invention as shown in the drawing, sheave 1 is shown as having a rim 2 of any desired character, here shown as a grooved pulley for a multi-V-belt drive. An integral web 3 connects the said rim to a hub portion 4. The term hub, or hub portion, may be used hereinafter and in the claims, to refer to the entire sheave 1, or other power transmission element having a hub portion. The hub 4 is provided with a tapered bore 5 and a flat, radial, end face 6. In the embodiment shown, two holes 7 are formed in the end face, parallel to the axis and at diametrically opposite points. These holes are tapped to receive hub starting screws, or bolts 8, the use of which will be described hereinafter.

Mounted directly on shaft 9 is a sleeve 10 centrally bored to a sliding fit on shaft 9 and split throughout its length along a substantially radial plane or a plane parallel to the axis of said sleeve, by a sawed or milled cut as at 11, the split or cut being of sufficient width or circumferential extent to permit the sleeve 10 to be contracted by clamping to tightly grip the shaft 9. The outer surface of the sleeve 10 is divided into a tapered portion 12, a radial shoulder 13 and a cylindrical portion 14. Portion 14 may obviously be other than truly cylindrical, but is essentially a portion of reduced size relative to the contiguous tapered portion, as the presence of the shoulder 13 indicates. In the cylindrical portion a groove of rectangular section is formed at 15 in which a split spring ring 16 may be assembled by expanding the ring, passing it over the end of the sleeve 10, and allowing it to contract or spring into place in engagement with the groove. The outside diameter of the ring 16 is sufficiently greater than the diameter of the cylindrical portion 14 of the sleeve that the ring forms an abutment or flange projecting above the surface 14 when in place and in engagement with the sides and bottom of the groove 15.

Between the shoulder 13 and the ring 16 an annular member, or ring, 17 having an inside diameter the same as the cylindrical portion 14 of the sleeve may be mounted. The annular member 17 may be rectangular in cross section and forms a demountable flange when in place, free to be rotated relative to the sleeve 10, but fixed against axial displacement relative to the sleeve by the shoulder 13 and ring 16. The annular member 17 is provided with axially extending threaded holes 18 equally spaced around the circumference of the annular member, and having their axes at equal distance from the axis of said annular member and in alinement with the radial end face 6 of the hub when assembled. In the embodiment shown in the drawing, there are three such holes 18 in each of which may be mounted a clamping screw, shown as a headless screw 19 capable of extending through said annular member into operative engagement with the end face 6 of hub 4 for a purpose explained hereinafter. There also may be provided two plain axial holes 20 at diametrically opposite points of said annular member so located as to be alineable with the holes 7 in the hub 4. Hub starting bolts 8 threaded to fit holes 7 in hub 4 and capable of extending freely through holes 20 in annular member 17 may be provided, of a length sufficient to accomplish the purpose described below in the description of operation of the invention. Bolts 8 are provided with heads 8' to engage the outer side of annular member 17 when in position.

The shaft and the sleeve may be provided with conventional key means indicated at 22, and the tapered portion 12 of the sleeve, and tapered bore 5 of the hub may also be provided with conventional key means as indicated at 23, said key means permitting relative axial movement of said shaft, sleeve and hub, but preventing relative rotation thereof.

The embodiment of the invention as described and shown in the drawing operates in the following manner. With all parts separated, assembly is made by passing the tapered bore 5 of hub 4 over the cylindrical portion 14 of sleeve 10 into keyed engagement with the tapered portion 12 of said sleeve. Annular member 17 is then placed in position on cylindrical portion 14 against shoulder 13. Split ring 16 may then be expanded, passed over the end of the sleeve and snapped into place in the groove 15 to act as a retaining abutment axially fixing the position of the annular member. Clamping screws 19 are now inserted in holes 18 and screwed lightly into engagement with, or just short of engagement with, the end face 6 of the hub. The entire sheave assembly 1 may now be slid onto the end of shaft 9 in keyed relation and placed in the desired axial position. Screws 19 may now be screwed tightly against hub face 6 and evenly set up forcing hub 4 to move axially against taper 12 and forcing split sleeve 10 to contract and grip shaft 9 as tightly as desired. The clamping action unites all the parts into a rigid power transmission unit as shown in Fig. 1, capable of serving in a belt drive transmission or any other similar transmission as gear, friction, chain, etc., as will be obvious to any person skilled in the art.

Figure 4:
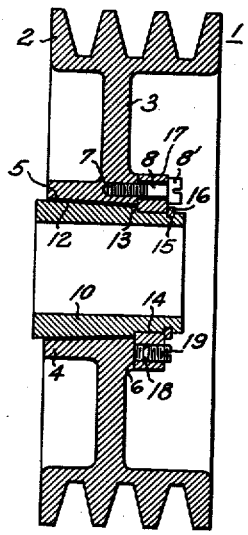
Fig. 4 is a view similar to Fig. 1, but with the shaft removed and the sheave in loosened position with the hub-starting bolts in place.

The operation of removing the sheave assembly consists of retracting screws 19 out of engagement with the face 6, thus loosening annular member 17 which may now be rotated on the sleeve portion 14 to aline holes 20 with holes 7 in the hub 4. Hub starting screws or bolts 8 are now inserted and threaded into holes 7. The bolts are too short to reach the bottom of holes 7 with the sheave in clamped position, and as the bolts are turned forcibly the heads take up against the outer surface of annular member 17 and the hub 4 is started, loosened, or drawn free of, taper portion 12 to the position as shown in Fig. 4, allowing the sleeve to relax its grip on shaft 9. The entire assembly may now be slid along the shaft, or removed, as a unit, or, if desired, the snap ring may be removed and the annular member and hub demounted without removing the sleeve from the shaft and another sheave rim having the same size hub portion, but possibly a different sized rim may be substituted in an obvious manner.

The screws 19 may be headless, as shown, and of just sufficient length so that they will be flush with or sunken within the body of annular member 17 when in clamping position, Fig. 1, thus presenting no external protuberance to catch threads of material, or attendant's clothing.

As an obvious but undesirable alternative, screws 19 may be made with heads, in which case they take the form of bolts 8, and will serve as clamping screws, and when removed from holes 18, may also serve as hub starting screws.

It is obvious that any other well known type of motion transmitting structure, not shown, such as lever, crank, sprocket, pinion, rotor, brake or clutch assembly, etc., having a tapered hub portion, may be substituted for the sheave member shown.

It should be noted that in assembly, the annular member 17 may be rotated to any desired position, allowing the clamping screws 19 to seat against different points in the hub face 6 each time the device is assembled on the shaft, avoiding undue wear and strain at certain points which would occur if the same points were always used as bearing points. Hub starting screws 8 should be removed for running.

It should also be noted that the clamping forces acting on the sleeve 10, that is, the force on the tapered portion exerted by the hub, and the reaction on the annular member 17 which is transferred to the sleeve 10 by the split ring 16, act at a minimum radius. Thus, the moments of forces tending to warp or deform the sleeve in an axial plane are minimized.

The above description is illustrative only, the scope of the invention being limited only by the scope of the claims herein.

It is claimed and desired to secure by Letters Patent:

1. In a shaft driving connection, a longitudinally split sleeve member having a tapered outer surface portion and a shaft engaging inner bore, a hub member having a tapered bore to fit said tapered portion, said sleeve member having a portion of reduced size adjacent one end of said tapered portion and a radial shoulder between said portion of reduced size and said tapered portion, an annular member demountably engaging said portion of reduced size, means engaging said portion of reduced size and spaced from said shoulder for normally fixing said annular member against axial displacement relative to said shoulder, clamping means operatively engaging said annular member and said hub member and capable of forcing said hub member onto said tapered portion, thereby clamping said hub member, sleeve member and shaft tightly together in driving relation.

2. A demountable shaft driving connection comprising a hub member having a tapered bore, a longitudinally split tapered sleeve member fitting said tapered bore and said shaft, ring means, means securing said ring means on said sleeve member at the smaller end thereof in axially fixed relation, clamping means operably engaging said hub member and said ring means to force said hub member and ring means apart thereby forcing said hub member onto said sleeve member clamping said hub member, sleeve member and shaft in driving relation, said ring means having an outside diameter such that said hub member, sleeve member and ring means will be held against accidental disassembly in the absence of either or both of said clamping means and said shaft.

3. A clamping sleeve assembly having a longitudinally split sleeve with a cylindrical inner bore, the outer surface of said sleeve comprising a tapered portion, a cylindrical portion of reduced diameter adjacent the smaller end of said tapered portion and a radial shoulder, a peripheral groove in said cylindrical portion spaced from said shoulder, an annular member having an outer diameter substantially larger than the smaller end of said tapered portion rotatably mounted on said cylindrical portion of said sleeve between said shoulder and said groove, and snap ring means engageable with said groove extending radially beyond the peripheral surface of said cylindrical portion to retain said annular member against axial displacement relative to said sleeve.

4. In a demountable sheave unit for use on a power transmission shaft, a longitudinally split sleeve member adapted to be contracted about said shaft and having its outer surface tapered for at least a portion of its length, a demountable hub member having a tapered bore fitting on the tapered surface of said sleeve member, a detachable annulus mounted on said sleeve member and secured in axially fixed relation thereto to provide for free radial contraction of said sleeve member about said shaft independently of said annulus, and clamping means operatively engaging said hub member and said annulus to force said hub member onto said tapered surface, thereby causing said sleeve member to tightly engage said shaft.

5. In a shaft driving connection, a tapered split sleeve adapted for mounting on a shaft, a hub member having a tapered bore mounted on said sleeve, an annulus mounted on said sleeve in axially fixed relation, said sleeve being free for operative contraction about said shaft independently of said annulus, and means operatively engaging said hub member and said annulus to force relative axial movement of said hub member and said sleeve, thereby clamping said hub member, sleeve and shaft in driving relation.

EUGENE J. OTTO.